Fig. 3

Patented Oct. 4, 1932

1,880,309

UNITED STATES PATENT OFFICE

ROBERT G. WULFF, OF LOS ANGELES, CALIFORNIA

PARTIAL PRESSURE PROCESS OF MAKING ACETYLENE AND OTHER PRODUCTS

Application filed October 2, 1928. Serial No. 309,749.

This invention relates to the production of acetylene, and a variety of gases, oils and tars from other hydrocarbons.

It has for its object the cheaper and more efficient production of acetylene, with its by-products of oils, tars, gases, and other substances, from a variety of raw materials among which are natural gas, artificial illuminating gas, casing-head gasoline, gasoline vapor, oil vapor, gas oil vapor, paraffin series hydrocarbons, olefine series hydrocarbons and the cyclic hydrocarbons of the naphthene and benzene series. The gases produced from these raw materials and other materials mechanically equivalent thereto are hereinafter referred to as "suitable gaseous raw material."

The invention resides in the selection of raw materials, their treatment as to temperature, pressure, dilution, time of treatment, exposure to a contact mass, kinds of contact masses, apparatus employed, flow rates, and the treatment of the reaction products after they are generated, and other details as will hereinafter appear.

Fundamentally, my process is one of heat treating hydrocarbons or mixtures of hydrocarbons while diluted with steam, mercury vapor, nitrogen, methane, carbon monoxide, or hydrogen, or any combination of these, for a certain period of time and cooling rapidly thereafter.

My experiments indicate that a suitable gaseous raw material can be produced from the following substances or combinations thereof, or from their mechanical equivalents:

1. Paraffins.
   a. Pure methane.
   b. Pure ethane.
   c. Casing-head gasoline vapor.
   d. Natural gas consisting of 85% $CH_4$ and 15% higher hydrocarbons.
1. Paraffins.—*Continued*.
   e. Gas oil containing from 30% to 35% naphthenes, 10–12% aromatics, remainder paraffins.
   f. Crude petroleum, kerosene, gasoline or any other liquid fraction.
   g. Natural gas carburetted with casing-head gasoline or any other fraction of crude petroleum, including normally gaseous hydrocarbons.
2. Olefines.
   a. Ethylene.
   b. Higher olefines.
3. Naphthenes.
   a. Those in gas oil.
4. Aromatic hydrocarbons.
   a. Benzol.
   b. Toluol.

While it has been found that acetylene can be formed from methane, according to my process, it should be stated that yields are low in comparison to those obtained from ethane or higher members. I therefore prefer, in using natural gas as raw material, to use gas as high in higher members of the paraffin and olefine series as possible.

In doing so, I prefer to use the apparatus shown in the accompanying drawings, Figs. 1 and 2. When operating on a laboratory scale the apparatus of Fig. 1 will be used. In the drawings it is shown more or less diagrammatically in side elevation. On an industrial scale I prefer to use the apparatus shown in Fig. 2, also shown diagrammatically in side elevation. It is to be understood that other apparatus may be used to carry out my process.

Referring again to Fig. 1, numeral 1 indicates an oil supply reservoir, 2 a water supply, and 3—3 delivery pipes for each, these supplying about a ten foot head. 4 and 5 represent oil and water meters, respectively, of the orifice type, 4ª and 5ª being manometers for gauging the flow. 6 and 7 are needle valves for regulating the flow of oil and water, respectively. 8 is a water boiling tube, this being merely a brass or steel tube wound externally with "nichrome" resistance wire. It may be adapted for generating mercury vapor in place of steam. Ducts leading steam from the tube 8 to the vaporizing and mixing tube 10 are shown at 9—9—9—9. The superheated steam generated in the tube 8 meets the stream of metered oil in the steel tube 10 and vaporizes it. If necessary, the tube 10 may also be externally heated to insure total vaporization of the oil and its efficient admixture to the entering steam. 11 is a packing gland at the far end of the tube 10, joining the tube 10 with the tube 12 in gas-tight manner, while 12 is the treating tube itself, which may be porcelain or sillimanite, but is made preferably of fused silica, of wall thickness depending upon the tube size. It may be filled with carborundum or other refractory "grain" or crystals (not shown). Copper and iron must be absent from the hot zone of the tube, since they decompose acetylene at high temperatures. 13 is a furnace surrounding the tube 12, containing carborundum rods 14, these constituting the heating element.

A thermo-couple is placed next the treating tube 12 at 15, the sensitive junction of which is shown at 15ᵇ. It is connected to an indicating pyrometer 15ª. The temperatures given herein, are therefore those of the outside of the tube 12, as measured at 15ᵇ, which is near the hottest portion of said tube. 16 is a condenser of the Liebig type, through the jacket of which cooling water is circulated. Condensed steam from the tube 12 finds an outlet through a U-tube 17. A gas sampling bulb 18 is placed in the line and it is from the point shown that samples were taken as a basis for the data to be given later. 19 is a gas meter adapted to measure the output of the installation. While in the foregoing explanation of the apparatus of Fig. 1 the raw material for making acetylene was called oil, any hydrocarbon capable of producing a suitable raw material is operative, and if said hydrocarbon is gaseous, the equipment of Fig. 1 can be modified to use said gaseous raw material.

Figure 2:
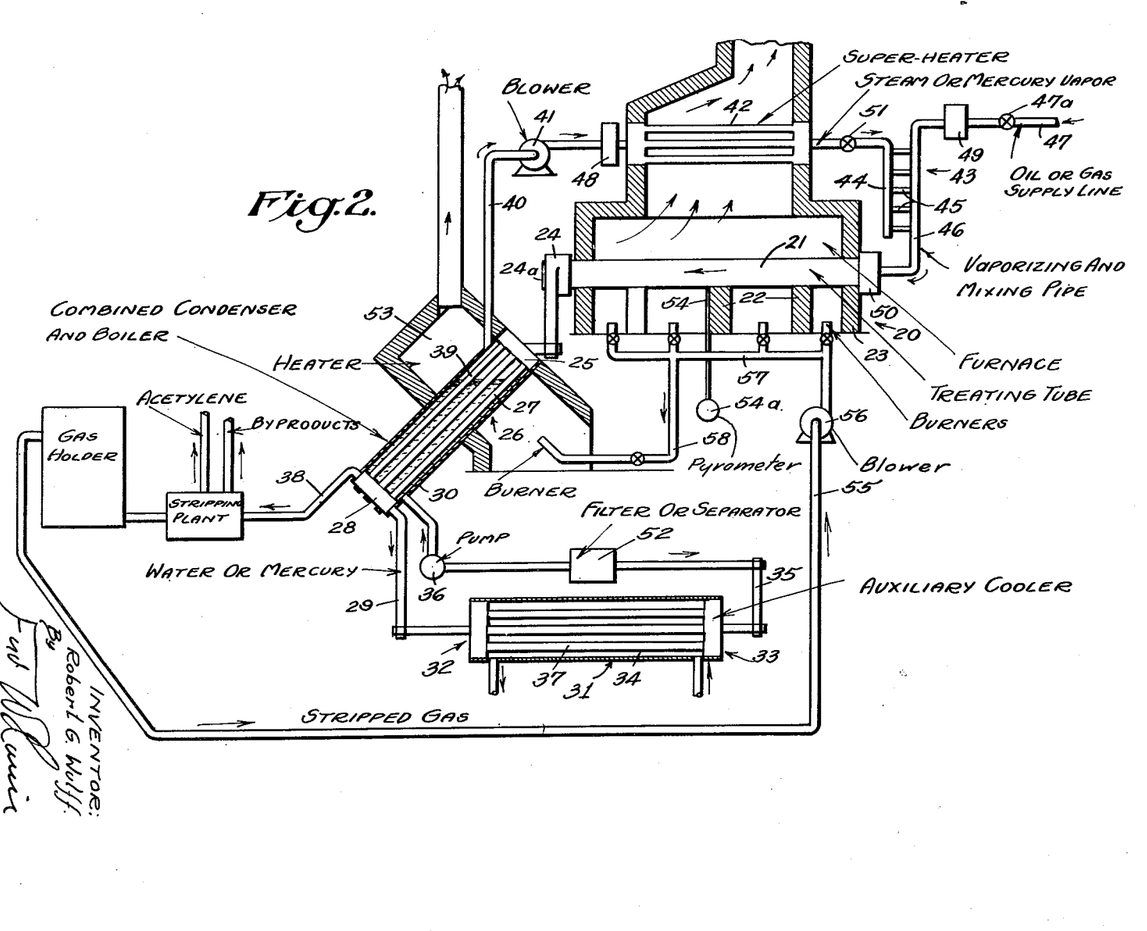

The large scale apparatus represented in Fig. 2 comprises an oil or gas supplying line 47 in which there is a valve 47ª and a meter 49. The line is joined with a vaporizing and mixing pipe 43, into which several cross pipes 45 deliver steam from the header 44. The lower part 46 of the vaporizing pipe 43 leads to an oil or gas-fired furnace 20, housing a carborundum (or equivalent) treating tube 21, about 12 feet long and about 8 inches inside diameter, which is filled with broken or crystalline carborundum, quartz or sillimanite or other suitable refractory, (not shown) and touching which is a thermo-couple 54, which is connected to an indicating pyrometer 54ª.

The arrangement in the furnace may be of about six treating tubes of about 8 inches inside diameter, these being filled with loose refractory crystals or broken pieces, or any of the conventional forms of tower packing.

These treating tubes may be joined in parallel or in series, or in any desired series-parallel arrangement. The filler serves the purpose of stirring the gas or vapor mixture and is desirable in accomplishing quick heating in large tubes. The tube is supported by piers 22 at various points. A gland or stuffing box 50 connects the tubes 46 and 21 in a gas-tight manner.

Any kind of refractory tube material or filling material may be used. A carborundum tube with a sillimanite filling can be used, or vice versa. The only conditions to be met are that the materials be sufficiently refractory and that they will not fuse with each other, or be detrimental to the formation of acetylene or other products desired.

On the far end of the refractory tube 21, there is an exit head 24, bearing a removable cap 24ª, through which the head and tube may be cleaned of carbon and tar when necessary. The exit head 24 connects, as to its other end, with a combined condenser and boiler 26 adapted for vaporizing and condensing either water or mercury. The latter consists of a shell and two headers 25 and 28, connected by a large number of tubes as at 39, which in this case should not be made of copper. In fact, no portion of the equipment coming in contact with acetylene should be of copper. Thin steel tubes are preferred, and these may be of "stainless" alloy or otherwise rust-proof.

The headers and tubes are so arranged that gases coming to the condenser are handled within the headers and tubes, heat transfer occurring through the walls of the tubes. The condenser is in a canted position so that a space about the place of entry of the pipe 40 is clear of water when the water level in the condenser is near the top. A downcoming pipe 29 serves to drain water from the condenser to an auxiliary cooler 31, of similar construction, but in horizontal position.

Warm water is furnished the auxiliary cooler by gravity and it is returned to the condenser after being cooled, by means of a pipe 35 and pump 36. A filter 52 is connected into the pipe line 35 to remove any solid impurities which may have been introduced into the water. A device for separating emulsified oil or otherwise conditioning or purifying the water may also be introduced into the line at this point.

Encircling the upper part of the condenser and boiler 26 is a heater, preferably gas-fired. Its function is to generate steam or mercury vapor in the upper part of the boiler and condenser. The pipe 40 and blower 41 are provided to transfer the steam formed in the boiler 26 to a superheater 42, before which is a steam meter 48. After the superheater, in the steam delivery line, is a valve 51, serving to control the steam flow. A number of cross pipes 45, already mentioned, connect the header 44 with the vaporizing pipe 43.

A stripping plant (diagrammatically shown) is provided to separate the acetylene and other valuable products from the gas mixture generated. The stripped gas is stored in the gas holder until needed, when it is burned under the cracking tube 21, being transferred there through the pipe 55 by a blower 56 through a manifold 57. A pipe 58 also carries a gas to the steam generator 26. The apparatus of Fig. 2 is also operative in using any hydrocarbon raw material for producing acetylene as listed above, and can be adapted to that end, whether said hydrocarbon is normally liquid or gaseous. So can said apparatus, either of Fig. 1 or Fig. 2 be adapted to the use of mercury or water as diluent, or to the use of substantially non-condensible diluents listed above as being operative.

Figure 1:
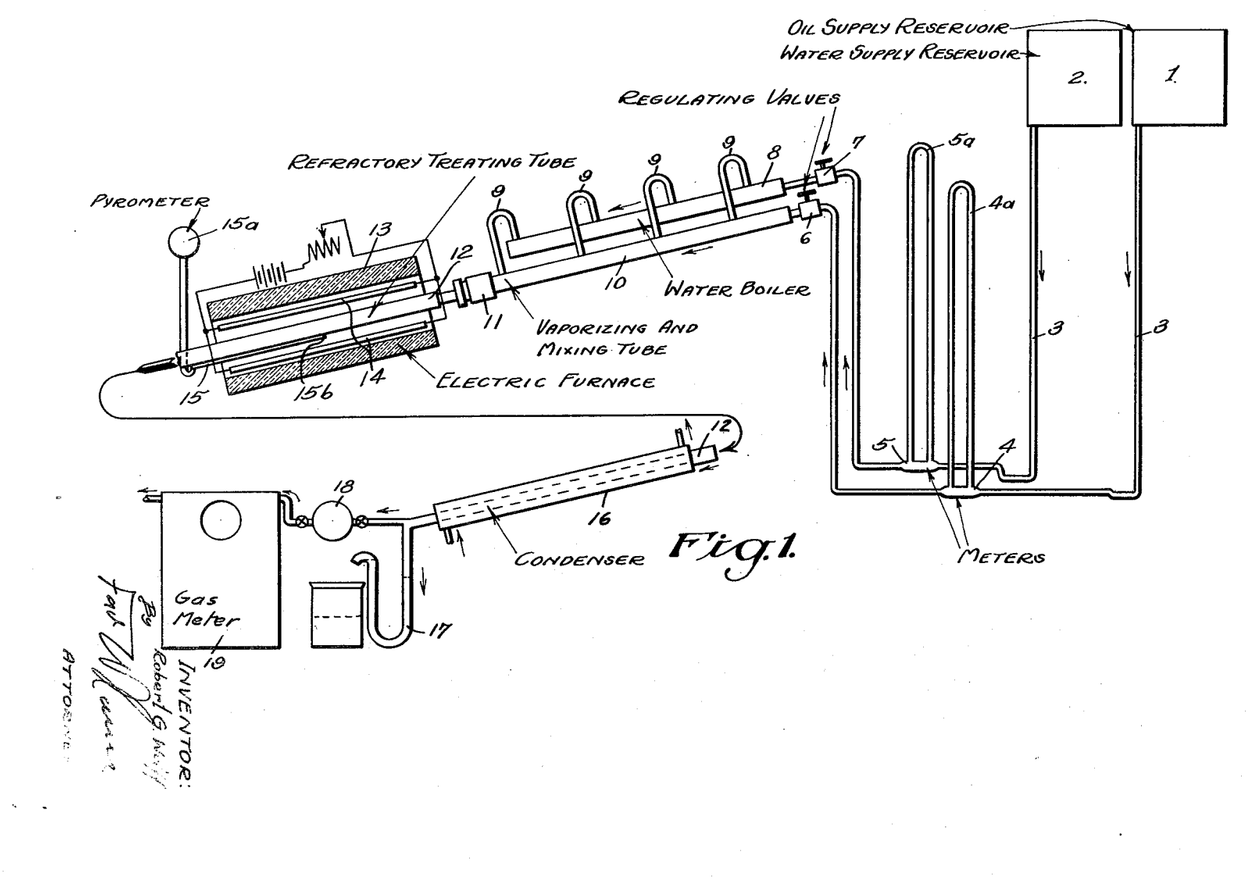

The method of operation of the apparatus of Fig. 1 is as follows:

The valves 6 and 7 are opened until the meters 4 and 5 give proper readings of the respective rates of flow. Oil and water then flow from their respective receptacles 1 and 2. The current for heating the furnace 13 has meanwhile been switched on. The tube 8 is likewise meanwhile heated. Metered water entering the tube 8 is therefore immediately converted into steam which enters the cross tubes 9, meeting the oil stream in the tube 10, where said oil is vaporized. The tube 10 may be heated externally in any conventional manner if necessary to accomplish full vaporization of the oil and its efficient mixing with the steam.

The mixture of oil vapor and steam then passes into the cracking tube 12, which may be made of kieselguhr and clay composition, carborundum, fused silica, sillimanite, porcelain or other ceramic and refractory materials. Its temperature is not less than 1500° F. and may be as high as 3500° F. The higher temperatures are preferred.

The tube is of such a length and the flow of vapor so regulated that the time of exposure of the mixed vapors to the heat of the furnace ranges from 2/1000 second to 5 seconds, depending upon the temperature of operation, and the amount of cracking surface exposed to the vapors. The amount of dilution of the oil vapor by steam or other diluent is such that the partial vapor pressure of the oil vapor ranges from just below atmospheric to approximately 1/20 inch of mercury, absolute pressure. The lower pressures are preferred since they induce less carbonization and form acetylene more efficiently.

The cracking tube 12 is preferably filled throughout its length, which approximates 18 inches, with carborundum grain, the size of which is about ¼ the inside diameter of the tube. The tube itself has an internal diameter of about one inch.

It lies within the capabilities of persons skilled in this art, such as chemical engineers to adapt either of the plants, shown in Figs. 1 or 2, to operation with mercury vapor, hydrogen, carbon monoxide, methane or nitrogen as a diluent. The use of mercury will involve the addition of a mercury boiler made of steel with suitable burners for heating it. The boiler will be so arranged as to maintain a pressure of (preferably) one atmosphere pressure of mercury vapor therein. Pressures much in excess of one atmosphere should not be employed because the accompanying high temperature of the vapor will give rise to a cracking action on the oil before thorough mixing with the oil takes place. It is desirable to accomplish dilution before any cracking takes place.

My method of making acetylene by the heat treatment of hydrocarbons mixed with a diluent constitutes one phase of my broad invention described in my copending application, Serial No. 281,406, filed May 29, 1928. This present application is a continuation in part of the application just referred to in respect to the dilution-employing methods and apparatus herein described. The use of a diluent of my present process is one means of attaining an absolute pressure less than atmospheric for the hydrocarbons when these are under heat treatment. In other words, mixing them with a diluent places them under a partial vapor pressure. This term is used in the sense that physical chemists employ it and will be understood by such persons and in general by all competent chemists and chemical engineers. It is to be brought out that steam and mercury are preferred diluents because they are easily condensible and thus yield a gas much more highly concentrated with respect to acetylene, allylene and ethylene gases. This of course makes the subsequent isolation of these desired gaseous constituents more easy and practical. So are water and mercury to be preferred over normally solid diluents conceivably usable, because they are easier to handle.

The following data is a report of the results obtained in putting through the apparatus of Fig. 1 a gas oil purchased from the General Petroleum Corporation of California. It is known as their gas oil No. 1, and contains from 30% to 35% of naphthenes, 10–12% aromatics and the remainder paraffin series hydrocarbons. In some of the tests, as will be noted on the tables below, the tube diameter was changed for examination of the effect of tube size on formation of acetylene. In the case of all data given herein, however, the several cracking tubes were heated in the same furnace, and therefore were heated for the same length, so that a comparison between tubes was possible based on internal cross-section which governed the time of cracking at any one rate of oil and steam flow.

Explanation of captions, applying to Tables 1, 2, 3.

a. Test number.
b. Lb. per hour of steam.
c. Lb. per hour of oil.
d. Millimeters of mercury pressure (partial) of oil before cracking.
e. Millimeters mercury partial pressure of the fixed gas before condensation of the steam, but after completion of cracking.
f. Cu. ft. per hour of fixed gas formed, room temperature and one atmosphere absolute pressure.
g. Temperature Fahrenheit (approximately the maximum temperature on the outside wall of the tube at it hottest point).
h. Time constant, derived by dividing the square of the internal tube diameter by the cu. ft. per hour of steam. Here the diameter is expressed in inches and the steam volume as reduced to one atmosphere absolute pressure and room temperature. For example, thus one pound of steam would represent 21.3 cu. ft. assuming that the steam would remain in the vapor phase at room temperature and one atmosphere absolute. This term is used merely because of the facility of computation and for all purposes here is proportional to the actual volume occupied at any one temperature. It must be realized that as the oil and steam mixture starts through the tube it is increasing steadily in temperature and therefore expanding partly from this cause alone before any cracking takes place. The steam and oil volume is therefore constant at no time and the time of heating therefore very difficult to arrive at.
i. Percent by volume of acetylene in the fixed gas.
j. Efficiency of conversion of oil into acetylene. Expressed in percent by weight.

TABLE No. 1.—¼" inside diameter sillimanite cracking tube, 0.08" tube wall. Not filled with refractory

| a | b | c | d | e | f | g | h | i | j |
|---|---|---|---|---|---|---|---|---|---|
| 114 | .403 | .0141 | 3.36 | 38.6 | .459 | 2403 | 7.26 | 15.50 | 34.1 |
| 115 | .399 | .0133 | 3.19 | 31.3 | .367 | 2301 | 7.34 | 18.52 | 34.5 |
| 116 | .401 | .0133 | 3.17 | 21.4 | .248 | 2201 | 7.30 | 21.0 | 26.5 |
| 117 | .407 | .0133 | 3.14 | 16.8 | .1970 | 2068 | 7.18 | 17.20 | 17.2 |
| 118 | .450 | .0163 | 3.48 | 22.4 | .292 | 2200 | 6.50 | 17.55 | 21.2 |
| 119 | .538 | .0190 | 3.39 | 19.01 | .294 | 2218 | 5.46 | 15.90 | 16.7 |
| 120 | .523 | .0179 | 3.29 | 23.2 | .351 | 2301 | 5.60 | 17.85 | 23.7 |
| 121 | .539 | .0179 | 3.19 | 28.3 | .446 | 2401 | 5.43 | 17.30 | 29.2 |
| 122 | .531 | .0191 | 3.45 | 27.1 | .420 | 2354 | 5.52 | 17.55 | 26.1 |

In the first four tests there was varied nothing but the temperature so as to see the effect on the acetylene percentage and the efficiency of formation.

The fifth test shows a little higher oil and steam rates of flow over the first four. It should be stated that throughout this description, in all tests mentioned and for which data are given herein, the proportion of oil to water flow was held constant. The constancy of the proportion of oil to water may be seen from the listed partial pressure of the oil vapor in the mixture, item $d$ of the tables.

Tests 119–122 inclusive show a still larger flow of oil and steam over the previous ones. Thus, in these three groups of tests indicated there is a change in the time of heating due to the hourly passage of different amounts of steam and oil through the same tube.

The study of the foregoing table as well as that of others to follow will be easier from curves to be given herein. In this manner it will be much easier to see the different effects and to appreciate the reason for the different experiments.

Full discussion of the tests will be given mainly with reference to the curves of Figs. 3 and 4 after all the data has been given. Test numbers will be found to identify the points so plotted so as to facilitate reference to the curves and tables.

TABLE No. 2.—0.4" inside diameter fused silica tube. Not filled with refractory. ⅛" tube wall. Apparatus of Fig. 1

| a | b | c | d | e | f | g | h | i | j |
|---|---|---|---|---|---|---|---|---|---|
| 123 | .492 | .0181 | 3.53 | 18.25 | .258 | 2003 | 15.25 | 11.88 | 11.5 |
| 124 | .547 | .0184 | 3.23 | 17.67 | .278 | 2100 | 13.72 | 13.66 | 13.9 |
| 125 | .507 | .0182 | 3.45 | 24.4 | .359 | 2198 | 14.77 | 14.80 | 19.8 |
| 126 | .520 | .0180 | 3.32 | 28.4 | .435 | 2300 | 14.38 | 13.30 | 21.7 |
| 127 | .829 | .0230 | 2.67 | 13.63 | .323 | 2100 | 9.04 | 12.50 | 11.9 |
| 128 | .644 | .0230 | 3.43 | 16.07 | .297 | 2100 | 11.62 | 11.78 | 10.3 |
| 129 | .630 | .0235 | 3.58 | 21.9 | .400 | 2204 | 11.90 | 13.98 | 16.1 |
| 130 | .607 | .0231 | 3.64 | 25.8 | .455 | 2300 | 12.34 | 13.87 | 18.5 |

Tests 123 to 126 inclusive were intended to show the variation of acetylene percentage with temperature as well as the variation in the efficiency of conversion with temperature, everything else held constant. Test 127 was intended to be a larger flow of oil and steam in proportion to those preceding. Actually the water flow was higher than wanted and this was corrected in the tests 128–130 following. These last three tests are intended to have constant conditions except for temperature, again to see the variation in acetylene percent and efficiency of formation.

The above results show that it is possible to obtain, by the use of a small bore, unfilled refractory tube, percentages of acetylene that the nearly as high as those obtained in filled tubes of larger bore. This is probably because intimate contact is obtained between the gas and the tube wall on account of the small bore.

TABLE No. 3.—⅞" inside diameter fused silica tube filled with 3 mesh carborundum grain (crystals) ⅛" tube wall. Apparatus of Fig. 1

| a | b | c | d | e | f | g | h | i | j |
|---|---|---|---|---|---|---|---|---|---|
| 131 | .690 | .0222 | 3.08 | 25.6 | .513 | 1998 | 25.9 | 14.02 | 22.0 |
| 132 | .704 | .0228 | 3.11 | 31.1 | .641 | 2104 | 25.4 | 10.96 | 20.8 |
| 133 | .652 | .0213 | 3.13 | 41.9 | .813 | 2196 | 27.5 | 6.76 | 17.5 |
| 134 | .726 | .0238 | 3.18 | 15.08 | .309 | 1796 | 24.6 | 9.90 | 8.70 |
| 135 | .726 | .0227 | 3.04 | 18.27 | .376 | 1907 | 24.6 | 15.02 | 16.8 |
| 136 | .679 | .0220 | 3.11 | 12.52 | .243 | 1701 | 26.4 | 6.26 | 4.68 |
| 137 | 1.286 | .0466 | 3.46 | 17.6 | .651 | 1877 | 13.9 | 10.64 | 10.1 |
| 138 | 1.286 | .0466 | 3.46 | 20.9 | .780 | 1996 | 13.9 | 15.60 | 17.7 |
| 139 | 1.154 | .0461 | 3.83 | 32.4 | 1.095 | 2090 | 15.5 | 14.60 | 23.5 |
| 140 | 1.246 | .0467 | 3.61 | 34.3 | 1.250 | 2197 | 14.4 | 12.52 | 22.6 |
| 141 | 1.255 | .0464 | 3.56 | 21.4 | .776 | 2041 | 14.2 | 15.42 | 17.4 |
| 142 | 1.263 | .0470 | 3.57 | 18.3 | .667 | 1937 | 14.1 | 11.00 | 10.5 |
| 143 | 1.848 | .0713 | 3.69 | 19.3 | 1.028 | 2001 | 9.70 | 13.14 | 12.8 |
| 144 | 1.848 | .0714 | 3.69 | 26.2 | 1.410 | 2089 | 9.70 | 16.06 | 21.4 |
| 145 | 1.817 | .0687 | 3.62 | 30.4 | 1.620 | 2207 | 9.85 | 15.68 | 25.0 |
| 146 | 2.19 | .0844 | 3.68 | 31.6 | 2.035 | 2206 | 8.15 | 21.1 | 34.3 |
| 147 | 2.51 | .0970 | 3.71 | 29.3 | 2.15 | 2193 | 7.15 | 23.2 | 34.6 |
| 148 | 2.95 | .1164 | 3.79 | 26.4 | 2.26 | 2193 | 6.07 | 17.92 | 23.6 |

Tests 131–136 have constant conditions except for the temperature which was varied to see the effect on the acetylene percentage and conversion efficiency. Tests 137–142 are the same at a higher oil and steam flow than the preceding, meaning a shorter time of heating. Tests 143–145 are the same thing again at a still higher oil and steam rate of flow. Tests 146–148 were carried out at a constant temperature but varying the rate of oil and steam flow, the reason for which will be apparent from the discussion below.

An example is here given of the method of arriving at the figure called the time constant, item $h$ of the tables.

Lb./hr or steam × 21.35 gives cu. ft./hr of steam, this being the volume of the steam if it were cooled to room temperature and still held at one atmosphere without condensation. Actually this is impossible but it is still a valid constant for the time of cracking comparison.

Thus as in test No. 114, we have .403 × 21.35 = 8.58 cu. ft/hr of steam. Tube diameter ¼". (¼)² = .0625 then (.0625/8.58) × 1000 = 7.26.

In the case of the ⅞" tube which was filled with carborundum crystals, it was assumed that the actual free volume of the tube was half of what it would be empty. This is pretty closely true, for instance, when such crystals are used to fill a container of about a half pint capacity.

So far it is apparent that the best found conditions for production of acetylene at a given temperature show that the higher the temperature the greater the percentage of acetylene in the permanently formed gas and also the higher the temperature the greater the efficiency of acetylene production or conversion of the oil.

Figure 4:
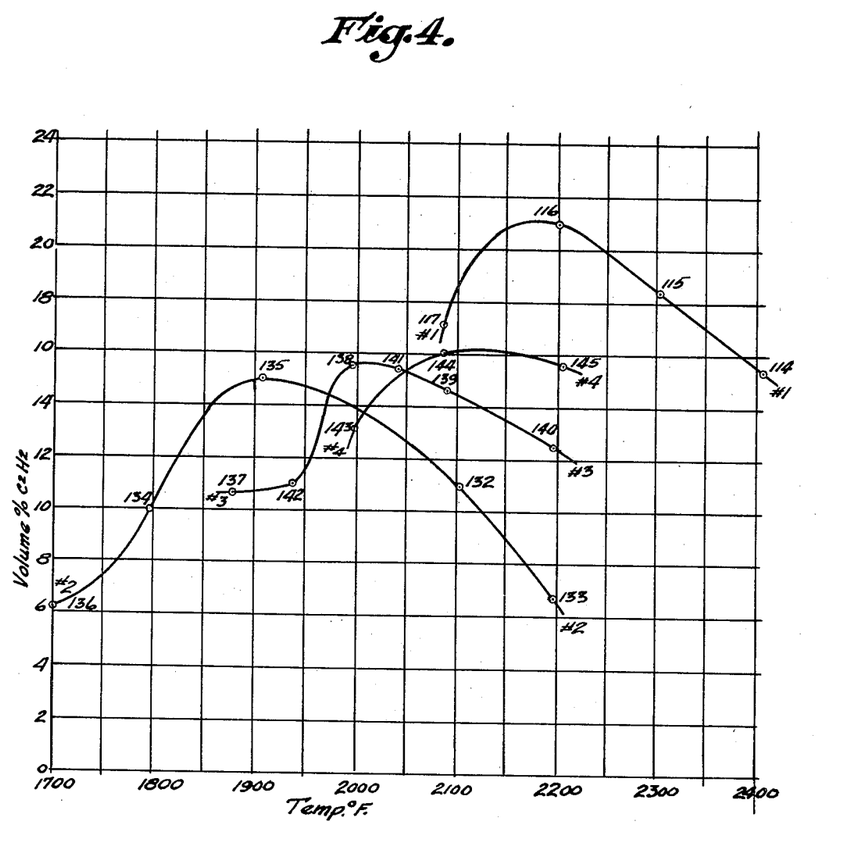

Referring now to curves 2, 3, and 4, Fig. 4, which represent the tests on the ⅞" tube, it is clear that the acetylene percentage passes through a maximum as the temperature is increased. This maximum occurs at a higher temperature the shorter the time of heating or the smaller the time constant. This can mean partly that it takes a higher temperature difference between the outside wall of the tube and the inside to pass the heat required on account of the higher rate of gas treatment, and also that the higher temperature thus will be necessary to increase the rate of cracking and acetylene formation.

Figure 3:
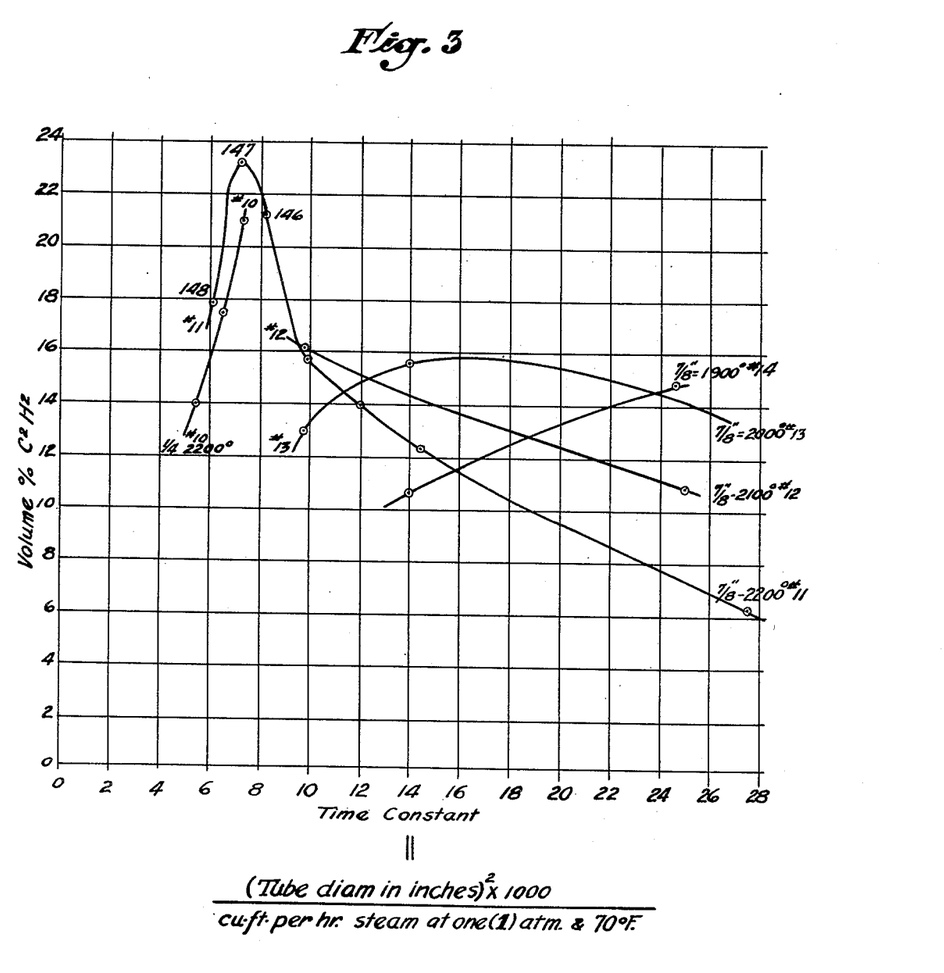
Figs. 3 and 4 are collections of curves which will be later discussed in detail, which graphically indicate the influence of time, temperature, and other factors in my process.

It is also obvious from curves 11, 12 and 13 of Fig. 3 that after the maximum of acetylene at any one temperature has been formed, any continued heating is very detrimental to the percentage of acetylene.

Another fact is that the higher the temperature, the higher the maximum percentage of acetylene, as is seen from the curves.

Curves 10–14 of Fig. 3 were derived from the curves 1, 2, 3 and 4 of Fig. 4, together with other data in the tables. It is obvious that the higher the temperature, the more positive the increase in acetylene percentage with the decrease in time of heating between the time limits 10 to 26. It must also be true that the higher the temperature the smaller the time at which the maximum percent of acetylene appears. It is proved on these curves definitely that at 2200° F. there is a fairly sharp peak at a time of 7, and that at 2000° F. there is a maximum, somewhere on the time scale at a value much larger than 7. It is also seen that the higher the temperature of operation the more narrow is the practical range of time of heating. Compare curves 11 and 13. Therefore the higher the temperature of operation the more accurately the time of heating has to be controlled and the more accurately the temperature as well must be controlled.

For operation of the apparatus of Fig. 1, according to the conditions of test 147, the time of heat treating is approximately 1/16 of a second. For operation of the same equipment according to test 135 the time of heat treating is about 0.21 second. This shows that there is a wide variation in the most suitable length of time of treatment for each of two temperatures not very different from each other, namely, 1900 and 2200° F. So, for temperatures above 3400° F. the time of heating or treating may be shortened to as little as 0.002 second, and for lower temperatures around 1400° F. may be increased to as much as five seconds.

The tables of data show that the efficiency with which oil is converted to acetylene increases with the acetylene percentage, but that there is a tendency for the maximum efficiency to occur at a temperature higher than that at which the maximum acetylene percentage occurs, given any one time of heating. However, test 147 at once shows the highest acetylene percentage obtained by this process, and also the highest efficiency of acetylene formation from oil.

Another advantage of this process is that the carbon that is always formed from cracking oil, usually in the hottest part of the tube, will in this process not accumulate, or can be removed. Water vapor will certainly be removing carbon at an appreciable rate as it forms. If it forms in a commercial furnace more rapidly than the water vapor removes it, it will only be necessary in practice to turn the oil off for a while, suspending acetylene formation to clean the tube out.

The heat balance will not be very seriously interfered with due to the fact that there is so much steam going through in operation compared to the amount of oil. Certainly, after such a cleaning there would be much less time lost than if it were necessary to cool down and probably less time lost even than if instead of cooling down, production was shut off and air run through. This latter would probably be the easiest means of removing accumulated carbon in the case of the mercury process, although in said mercury process steam may be used intermittently for cleaning, or even continuously during operation of the process.

The carbon removing action in the case of water is of course that of the water gas reaction in which the carbon by reacting with the steam is converted to carbon monoxide and removed as a gas. In the case of using air, it would be one of carbon monoxide and carbon dioxide formation as well, with their removal as gases.

It will probably be advisable to circulate the water used as a diluent during operation and so save acetylene dissolved therein upon condensation of the water, since the solubility of acetylene in water is appreciable. Besides that, there will probably be by-products of value contained in the water that would be worth extraction.

Complete data on the composition of the non-acetylene reaction products is not yet available. CO is present at a fairly constant percentage approximating 15, when steam is used as diluent with oil.

Herewith is given a table of illustrative gas analyses where constituents are reported in volume percent. Alkylenes are hydrocarbons of the ethylene series, exclusive of ethylene, which is separately reported. Test numbers correspond with those of Tables 1 and 2.

TABLE No. 4

| Test 114. $CO_2$ $O_2$ | | $C_2H_2$ | $C_2H_4$ | CO | $H_2$ | Assumed | | Alkylenes |
|---|---|---|---|---|---|---|---|---|
| | | | | | | $N_2$ | $CH_4$ | |
| 3.38 | .29 | 15.50 | .65 | 15.60 | 48.50 | 10.00 | 6.08 | 0.00 |
| Test 115. 2.26 | .31 | 17.12 | 0.00 | 14.05 | 48.40 | 10.00 | 6.83 | 1.03 |
| Test 126. 3.64 | .31 | 13.30 | 2.40 | 14.02 | 47.80 | 10.00 | 7.39 | 1.14 |

Test 126 was examined for allylene or methyl acetylene $CH_3.C:CH$ and showed 2.20% by volume.

It may be seen from these gas analyses that it is not necessary to the success of the process that the diluent which in these cases was steam, be totally inert and unreactive with the oil vapor or its intermediately formed products in the treating tube. Here there was a very appreciable formation of carbon monoxide which did not prevent the formation of acetylene or other of the constituents listed.

The operation of the apparatus shown in Fig. 2 is similar in general principle to that shown in Fig. 1. The vaporization of the oil takes place in the tube 43 by means of steam furnished from the header 44 and the efficient mixing of steam and oil is accomplished therein. The cracking tube 21 is governed as to its length and temperature by the same considerations given for the tube of Fig. 1. The contact mass (carborundum, quartz, sillimanite or equivalent) may, however, be of a grain size much less than ¼ the inside diameter of the tube.

If more than one tube is used, means may be provided for cutting out any one of the tubes for cleaning (removal of carbon and tar) while the other tubes are left undisturbedly operating. To clean out any one tube, steam may be blown through it while the tube is still hot, thereby oxidizing the carbonaceous matter by a reaction similar to the water gas reaction. To accomplish a continuous cleaning, mixtures of diluents may be used in the main process, specifically a mixture of mercury vapor and steam.

The treated gases pass into the tubes of the condenser and boiler 26, meeting first a steam zone and assisting the heater 53 in the generation of steam. They then pass down into the water zone where they are quickly cooled by the stream of water entering from the pipe 35.

Here, water condenses and the fixed gases then pass into the lower header 28 and find an exit through the pipe 38, while the condensed water is also recovered at 29 and may be returned to the system. The operation of the superheater and auxiliary cooler will be self-evident.

The condenser and boiler 26 is therefore also a heat interchanger serving to recover the heat content of the steam and other gases issuing from the cracking tube 21 in admixture. Said heat is thus entering the water coming from the pipe 35, which surrounds the tubes 27 of the condenser 26. The furnace 53 serves the purpose of supplying any deficiency of heat required for the evaporation of the required steam of the process. The superheater 42 furnishes any additional heat required to insure the total evaporation of the oil in the pipe 43. The auxiliary cooler 31 reduces the temperature of the incoming water in the pipe 29 sufficiently to render the condenser 26 operative.

The meter 48 of Fig. 2 can be adapted to electrically operate the valve 51 to insure a constant rate of steam or mercury vapor flow. Similarly, the meter 49 can be made to control the valve 47ª. The temperature of the furnace should be automatically held at the desired value, and any means known to the art may be used to accomplish this result. In using murcury the filter or separator 52 shown in Fig. 2 should be placed in the line 29 instead of where it is shown. When mercury condenses in condenser tubes 27, each little droplet will be covered under some of the operating conditions with a film of tar or heavy oil. Separation of this tar or oil should be effected before said mercury enters the cooler 31 in order that more efficient heat transfer may take place in the cooler. If the mercury descending pipe 29 is allowed to stand in a U-tube of steel at the height of ten feet or more, the oil coating the drops of mercury will be squeezed out due to the weight of the mercury near the bottom of the U-tube. Clean mercury can then be drawn from the far arm of the U-tube while the oil will accumulate above the mercury in the near arm. The use of hydrogen can be carried out either by adapting a bank of cylinders of the compressed gas to supply the diluent through reducing valves or the hydrogen may be supplied from a gas holder obtaining its supply under comparatively low pressure from stripped water gas, a "silicol" process plant or from the stripped gas of this process or from any other of the usual commercial methods of generating hydrogen.

An apparatus has been invented for this reaction therefore, in which there is marked conservation of heat, fuel, water and raw materials. Heat is recovered by the condensation of the steam, the water is likewise so recovered and the gas stripped in the stripping plant is stored in the gas holder until it is passed back to the furnace about the cracking tube, and there used as fuel.

The gases which may be dissolved in water recovered from the pipe 29 can be saved by the return of this water to the steam generator.

In the foregoing matter are illustrated the effects and yields obtained when steam was used as a diluent. The following tests give the same information for tests generally similar to the steam diluent tests except that mercury vapor is the diluent. It is to be noted that in some cases higher yields are obtainable by the use of mercury than are realized by the use of steam.

The following report of tests give the data obtained by the use of mercury as a diluent when treating a gas oil purchased from the General Petroleum Corporation of California. It is known as their gas oil No. 1 and contains from 30% to 35% by weight of naphthenes, 10% to 12% of aromatics, and the remainder paraffin series hydrocarbons. The apparatus of Fig. 1 was used, employing a ¼" i. d. ⅜" o. d. sillimanite cracking tube.

*Explanation of captions* a. Test number.
b. Lb. per hour of mercury used.
c. Lb. per hour of oil used.
d. Millimeters of mercury partial pressure of the oil vapor before cracking.
e. Millimeters partial pressure of the fixed gas after completion of cracking but before condensation of the mercury.
f. Cu. ft. per hour of fixed gas formed, room temperature and one atmosphere absolute pressure.
g. Temperature Fahrenheit (approximately the maximum temperature on the outside wall of the tube at its hottest point).
h. Time constant, derived by dividing the square of the internal tube diameter expressed in inches by the cubic feet per hour of mercury vapor, and then multiplying by 1000. This volume of mercury vapor is that computed to room temperature and one atmosphere absolute pressure, although the mercury would not actually exist as a vapor under those conditions. Any other arbitrary ratio of tube size to rate of mercury flow would have done as well, such as the cross-sectional area of the tube divided by the pounds of mercury per hour. In view of the condition that the mercury vapor is present in a large proportion to the oil vapor in all these tests, the time of treating or cracking is approximately dependent alone on the rate at which the mercury is passed through, and the cross-section of the tube.
i. Percent by volume of acetylene in the fixed gas.
j. Efficiency of formation of acetylene, expressed in percent by weight of oil converted.

TABLE No. 5

| a | b | c | d | e | f | g | h | i | j |
|---|---|---|---|---|---|---|---|---|---|
| 65 | 0.427 | .00421 | 10.38 | 25.4 | .0284 | 2200 | 76.1 | 0.1 | 0.05 |
| 66 | 1.690 | .00421 | 2.66 | 16.9 | .0713 | 2200 | 19.95 | 0.1 | 0.11 |
| 67 | 2.06 | .00421 | 2.17 | 11.8 | .0622 | 2080 | 15.8 | 10.1 | 10.1 |
| 68 | 2.12 | .00421 | 2.12 | 11.1 | .0604 | 2205 | 15.4 | >7.5 | >7.3 |
| 69 | 8.26 | .00841 | 1.09 | 2.95 | .0621 | 2100 | 3.94 | 8.3 | 4.1 |
| 70 | 8.26 | .00841 | 1.09 | 3.07 | .0643 | 2307 | 3.94 | 10.9 | 5.6 |
| 71 | 8.07 | .00841 | 1.11 | 3.87 | .0794 | 2360 | 4.02 | 10.3 | 6.6 |
| 72 | 4.59 | .00841 | 1.95 | 6.06 | .0709 | 2180 | 7.08 | 11.7 | 6.7 |
| 73 | 4.19 | .00841 | 2.14 | 10.3 | .1105 | 2290 | 7.76 | 13.6 | 12.1 |
| 74 | 4.51 | .00841 | 2.12 | 10.5 | .1143 | 2389 | 7.20 | 16.9 | 15.5 |
| 75 | 4.68 | .00841 | 1.91 | 10.5 | .1261 | 2476 | 6.94 | 17.0 | 17.3 |
| 76 | 3.50 | .00841 | 2.56 | 10.8 | .0972 | 2333 | 9.28 | 17.0 | 13.3 |
| 77 | 3.74 | .00841 | 2.40 | 17.0 | .1641 | 2433 | 8.71 | 17.6 | 23.2 |
| 79 | 3.12 | .01450 | 7.82 | 23.2 | .1875 | 2013 | 10.45 | 10.7 | 9.4 |
| 80 | 3.12 | .01450 | 7.18 | 21.4 | .1730 | 2052 | 10.45 | 10.3 | 8.3 |
| 81 | 3.68 | .01450 | 6.31 | 22.0 | .2111 | 2105 | 8.84 | 11.2 | 11.0 |
| 82 | 3.56 | .01450 | 6.56 | 24.2 | .2250 | 2147 | 9.15 | 14.2 | 14.9 |
| 83 | 3.67 | .01370 | 6.37 | 23.9 | .2220 | 2210 | 8.87 | 16.2 | 17.7 |
| 84 | 3.32 | .01597 | 7.72 | 30.3 | .2650 | 2258 | 9.77 | 17.4 | 19.5 |
| 85 | 3.30 | .01480 | 7.39 | 32.0 | .2790 | 2311 | 9.86 | 18.7 | 23.8 |
| 86 | 3.23 | .01370 | 7.24 | 32.6 | .2780 | 2355 | 10.10 | 18.5 | 25.4 |
| 87 | 3.48 | .01370 | 6.59 | 33.2 | .306 | 2416 | 9.34 | 21.4 | 32.3 |
| 88 | 3.37 | .0206 | 9.03 | 41.6 | .375 | 2410 | 9.64 | 20.4 | 25.1 |
| 89 | 3.35 | .0293 | 11.73 | 53.4 | .487 | 2407 | 9.72 | 14.3 | 16.1 |
| 90 | 3.35 | .0286 | 11.53 | 49.7 | .450 | 2456 | 9.72 | 17.4 | 18.5 |
| 91 | 2.96 | .0216 | 9.38 | 44.4 | .399 | 2463 | 11.02 | 19.2 | 23.9 |
| 92 | 3.50 | .01928 | 8.34 | 38.6 | .360 | 2508 | 9.28 | 20.4 | 25.8 |
| 93 | 2.39 | .01960 | 7.56 | 44.3 | .327 | 2405 | 13.05 | 10.4 | 12.1 |
| 94 | 2.05 | .0203 | 9.86 | 66.8 | .380 | 2515 | 15.85 | 17.7 | 22.4 |
| 95 | 2.57 | .0203 | 7.88 | 43.5 | .300 | 2147 | 12.68 | 20.2 | 20.2 |
| 96 | 2.55 | .0203 | 7.94 | 51.3 | .354 | 2505 | 12.75 | 20.6 | 24.2 |
| 104 | 3.68 | .01553 | 4.49 | 32.3 | .313 | 2400 | 8.86 | 20.2 | 27.5 |

In test 104 the total time of treating, that is, the total time that the oil and mercury mixture was above room temperature was about 0.080 second. The time constant is 8.86 which thus roughly shows that the time range within which tests were made in this table is from 0.035 to .69 seconds with corresponding time constants 3.94 and 76.1. It is preferred to operate this process above 2200° F. and the partial pressures of the oil vapor between 1 and 12 millimeters, when using gas oil. It is preferred to have the total pressure within the treating tube at approximately one atmosphere.

In using the mercury process the tube 21 of Fig. 2 may be cleaned of carbon, preferably by first shutting off the mercury bearing gas and running in steam at the lower part of the pipe 46. The ensuing reaction which is, in general, an oxidizing one between the steam and the carbon is an effectual remover of the latter.

I believe that it is new information that mercury vapor is indifferent and does not tend materially to destroy acetylene that is formed, either by catalysis or special chemical reaction. It has the additional advantage of easy condensability, and another one of its being a liquid at ordinary temperatures so that it will not solidify and so require more complicated equipment industrially to keep it in a liquid condition. Another of its advantages is the large heat transfer that it gives to cooling or heating or heat-exchanging surfaces so as to permit smaller and so less expensive construction to give a desired capacity of acetylene production. Another advantage in its use as disclosed is that it does not interact with the materials with which it is mixed in such a way as to deteriorate or to become irrecoverably a part of the permanently formed gas and so occasion losses of mercury in operation, which would be expensive. Still another of its advantages is that it is one among the conceivably usable metals as a diluent that does not coat and corrode steel parts which would normally constitute the equipment of an industrial plant. The inner wall of the steel boiler that I have used is totally unaffected after considerable use. This last is not a new fact but nevertheless constitutes an advantage.

The following table gives a report of the results obtained when benzol vapor diluted with mercury vapor is treated by my process. Here again the apparatus of Fig. 1 was used, with a ¼″ i. d., ⅜″ o. d. sillimanite cracking tube.

*Explanation of captions* a. Test number.
b. Lb. per hour of mercury used.
c. Lb. per hour of benzol used.
d. Millimeters mercury partial pressure of the benzol before cracking.
e. Millimeters partial pressure of the fixed gas after completion of crackng, but before condensation of the mercury.
f. Cu. ft. per hour of fixed gas formed, room temperature and one atmosphere absolute pressure.
g. Temperature Fahrenheit (approximately the maximum temperature on the outside wall of the tube at its hottest point).
h. Time constant, derived by dividing the square of the internal tube diameter expressed in inches by the cubic feet per hour of mercury vapor, and then multiplying by 1000. This volume of mercury vapor is that computed to room temperature and one atmosphere absolute pressure, although the mercury would not actually exist as a vapor under those conditions. Any other arbitrary ratio of tube size to rate of mercury flow would have done as well, such as the cross-sectional area of the tube divided by the pounds of mercury per hour. In view of the condition that the mercury vapor is present in a large proportion to the oil vapor in all these tests, the time of treating or cracking is approximately dependent alone on the rate at which the mercury is passed through, and the cross-section of the tube.
i. Percent by volume of acetylene in the fixed gas.
j. Efficiency of conversion of benzol into acetylene, expressed in percent by weight.

TABLE No. 6

| a | b | c | d | e | f | g | h | i | j |
|---|---|---|---|---|---|---|---|---|---|
| 97 | 3.41 | | | | | 2200 | 7.48 | | |
| 98 | 3.41 | .0224 | 12.5 | 11.4 | .1000 | 2305 | 7.48 | 4.88 | 1.47 |
| 99 | 3.38 | .0243 | 13.7 | 16.4 | .1433 | 2402 | 7.54 | 5.55 | 2.22 |
| 100 | 2.78 | .0235 | 16.1 | 24.7 | .1795 | 2507 | 9.15 | 5.78 | 2.99 |
| 101 | 2.06 | .0235 | 21.6 | 29.6 | .1903 | 2450 | 12.4 | 4.22 | 1.95 |
| 102 | 2.06 | .0175 | 16.1 | | | 2500 | 12.4 | | |
| 103 | 3.34 | .0175 | 10.1 | 15.2 | .1307 | 2451 | 7.65 | 5.55 | 2.80 |

Data of test 97 is incomplete, due to the condition that for that rate of mercury flow and that temperature the formation of gas was too slow. In other words, the benzol under this condition either forms other liquid or solid products, or comes through unchanged, and does not form gas.

In comparing the action of benzol in making acetylene to that of oil or paraffin series hydrocarbons in general, I have found that benzol has a great tendency to form either carbon or other liquid bodies. At high temperatures the carbon formation predominates, while it is also favored by the increase in the benzol vapor pressure. At somewhat lower temperatures the liquid formation is favored, with resulting small formation of gas. The change from one to the other is not so sharp with the paraffin series bodies, nor is the effect of pressure so decided in the formation of carbon. With the paraffin bodies, liquid condensates and carbon can apparently form together in varying proportions according to the temperature. With benzol the tendency is to form either one or the other, a comparatively small change in conditions of operation being capable of bringing it about.

*Data test No. 103 computed from Table No. 6, and with analysis of gas formed*

Mercury vapor flow, 6.41 cu. ft. per hour figured at room temperature and one atmosphere.

Benzol vapor flow, 0.0863 cu. ft. per hour figured at room temperature and one atmosphere.

Computed volume percent of benzol vapor before cracking, 1.33.

Computed volume percent of formed gas at exit and before condensation of the mercury, 1.99.

Computed percent of possible gasification of the benzol, 50.5.

Gas composition

| Allylene | $CO_2$ | $O_2$ | $N_2$ | Olefines | Acetylene | $H_2$ | CO | Paraffins |
|---|---|---|---|---|---|---|---|---|
| 0.42 | 0.35 | 1.17 | 4.68 | 0.67 | 5.13 | 78.30 | 1.76 | 7.56 |

*Data test No. 104 computed from Table No. 5, with analysis of gas formed*

Mercury vapor flow, 7.06 cu. ft. per hour figured at room temperature and one atmosphere.

Oil vapor flow, 0.042 cu. ft. per hour figured at room temperature and one atmosphere.

Computed volume percent of oil vapor before cracking, 0.592.

Computed volume percent of formed gas at exit and before condensation of the mercury, 4.24.

Computed percent of possible gasification of the oil, 67.7.

Percent of oil converted into acetylene, by weight, 27.5; theoretically possible conversion, 91.5.

Gas composition

| $CO_2$ | $O_2$ | $N_2$ | Allylene | Acetylene | Alkylenes | Ethylene | $H_2$ | $CH_4$ | CO |
|---|---|---|---|---|---|---|---|---|---|
| .81 | .70 | 2.93 | 1.56 | 18.6 | 2.9 | 6.58 | 48.0 | 16.70 | 1.18 |

In the case of this test there was formed some oil condensed at the outlet end of the furnace where the condensed mercury was collected, which might have been unchanged original oil but more probably was a modified oil. It had a yellow color but was not further examined. This oil in practical operation might be mixed with the entering raw oil for a second cracking or it might also be used for fuel.

Test 102 is incomplete due to the fact that the sillimanite tube which was being used as a treating tube plugged up with carbon showing heavy formation of the latter. In test 103 the time of treating is roughly 0.069 second. The range of time used is from 0.068 to 0.12 second. While the test just given shows the manufacture of acetylene containing gas from benzol vapor, it is to be understood that mercury vapor may be used not only in connection with benzol but with any of the raw materials listed; likewise steam, hydrogen and nitrogen are acceptable diluents not only with aliphatic hydrocarbons but also the aromatics.

In tests using the combination: casing-head gasoline and mercury, very good results were obtained. A sample of very light casing-head gas which showed pressure in a closed container at room temperature and which was rich in ethane and propane was used. It was utilized in gaseous form, made so by spontaneous evaporation and was supplied through a reducing valve. The apparatus and method was otherwise identical with that used in the experiments in which gas oil and mercury were used. The composition of the gaseous product obtained after treatment was:

| $CO_2$ | $O_2$ | $N_2$ | Allylene | Acetylene | Alkylenes | Ethylene | $H_2$ | $CH_4$ | CO |
|---|---|---|---|---|---|---|---|---|---|
| 1.28 | 0 | 0 | 0.97 | 27.40 | 1.28 | 14.70 | 32.30 | 18.10 | 3.88 |

A statement of the conditions under which the test was carried out is as follows, using the apparatus of Fig. 1, with a sillimanite cracking tube ¼" i. d. and ⅜" o. d. (see previous data for explanation of captions). (c) represents cu. ft. per hr. of vapor used.

| a | b | c | d | e | f | g | h | i | j |
|---|---|---|---|---|---|---|---|---|---|
| 107 | 3.66 | .0423 | 4.54 | 17.2 | .1630 | 2408 | 13.8 | 27.4 | 69.6 |

The comparatively large percentages of ethylene formed during this test and others indicate that this gas might be an intermediate product in acetylene formation. Accordingly a guaranteed sample of ethylene was obtained from the Certified Laboratory Products Co. of Glendale, California, and it was heat treated while diluted with mercury vapor, in the same manner as in the tests with gas oil, benzol and casing-head gasoline. A gaseous product was obtained showing the following approximate analysis, as of my test No. 105:

| $CO_2$ | $O_2$ | $N_2$ | Allylene | Acetylene | Alkylenes | Ethylene | $H_2$ | $CH_4$ | CO |
|---|---|---|---|---|---|---|---|---|---|
| .70 | 0 | 0 | .53 | 39.9 | 1.33 | 30.5 | 23.23 | .77 | .98 |

Since it is a comparatively easy and well known process to make ethylene from petroleum oils, it follows that I can also manufacture acetylene from oil by a two stage instead of a one stage process. In doing so, I may make ethylene from any liquid petroleum fraction by any means known to the art. I can then crack the ethylene while it is mixed with mercury vapor, nitrogen or hydrogen and whether or not it is diluted with the miscellaneous by-product gases of initial manufacture of ethylene from petroleum.

To obtain a mixture of ethylene and hydrogen, I may use the unseparated gaseous product of the manufacture of ethylene according to the process of Eldred & Mersereau, United States Patent No. 1,234,886, July 31, 1917. Such a gas contains about 40% ethylene, methane, hydrogen, and other gases.

Not only ethylene seems to be particularly efficacious in producing acetylene in my process, but also the corresponding paraffin, ethane. Indeed, any chain hydrocarbon has the effect of giving high yields of acetylene in direct proportion to its amount present.

I have even found, for instance, that a natural gas containing 85% of methane and fifteen percent of higher members of the paraffin series, forms acetylene efficiently in reference to the higher hydrocarbon content. In connection with this I have found that pure methane will form acetylene itself, but not in as high a percentage as will natural gas under the same conditions, of the above composition; and also not in as high a percentage as pure methane to which has been added casing-head gasoline vapor. All the substance of this paragraph refers to the treatment of the gas mixture mentioned or the pure gas at a total pressure of approximately one atmosphere absolute. Thus, the higher hydrocarbon content may here be regarded as diluted with methane which though not under all conditions inert, is nevertheless relatively so. In one case where I had cracked natural gas at atmospheric pressure, I found that the quantity of methane after treatment was substantially the same as before, and that the higher hydrocarbons had virtually disappeared.

There was a resulting acetylene content which represented efficient conversion of these higher hydrocarbons to acetylene. This fact is regarded as important, since natural gas of substantial higher hydrocarbon content and of large methane content, is available in many places and is already in a condition of dilution suitable to formation of acetylene by treatment at a total pressure of approximately one atmosphere.

A general summing-up of the chemical principles governing my process will include the following conclusions (among others);

1. The yield of acetylene is due largely to the conversion of hydrocarbons above methane in the case of aliphatic hydrocarbons. Numerous hydrocarbons of different series may be employed.

2. Acetylene formation does not occur appreciably below 1500° F. and above this temperature the acetylene yield is higher, the higher the temperature employed in cracking.

3. The yield of acetylene is seriously diminished if the cracking treatment lasts more than five seconds. It should last more than 0.002 seconds. Quick cooling of the gaseous product is essential. The actual most efficient length of time to crack a hydrocarbon raw material is shorter the higher the temperature.

4. The diluents employed should be so used as to reduce the partial pressure of the hydrocarbon gas under treatment to 14 millimeters, though higher pressures can be used. The diluent need not necessarily be inert. Partial pressures much below 14 millimeters are well suited to benzol.

5. Dilution is one way of reducing the pressure on the gas under treatment. Although the diluted gas mixture may be under a pressure higher than atmospheric, the partial pressure on the hydrocarbon gas may still be much less than one atmosphere.

6. Cracking, with consequent formation of acetylene is favored by the presence of hot refractory contact masses. Their action is not definitely catalytic, but seems to be a function of the amount of surface presented. If the bore of the reaction tube be sufficiently long and narrow (for a given temperature) and the speed of the gas flowing therethrough be sufficiently high, no interior contact mass is necessary.

7. Paraffin hydrocarbons all form more or less oil and tar under favorable conditions for making acetylene. The smaller the paraffin molecule, except for methane, the less oil and tar, and the more efficient conversion into acetylene. For olefines the same relations hold. Ethylene makes acetylene very efficiently, and extremely little oil or tar.

8. Ethylene is probably an intermediate product in the formation of acetylene by this process.

9. Allylene, and olefines other than ethylene, and ethane can be formed by reducing the temperature or decreasing the time of heating.

10. There is a sharper effect and greater advantage of very low partial pressures in making acetylene from benzol and other aromatics, and there is in the use of paraffin hydrocarbons for the same purpose.

It is to be understood that the acetylene content of the gaseous product of my process may be extracted by any means known to the art; for instance, by washing the gas with acetone, or acetaldehyde or pyridine. Such a step is to be regarded as a part of my process and I may use here the process of my application Serial No. 301,402, filed August 22, 1928.

By operating at the lower temperatures (near 1500° F) the process may be made to yield acetylene and an increased amount of tar and oil and ethylene. Such operation may possibly at times be more profitable than the production of a gas high in acetylene. The low temperature process is therefore to be regarded as being distinctly within the scope of my invention. The tars and oils, which are usually produced as fogs, may be collected by any suitable scrubbing or washing means, or by an electrical precipitator.

Indeed, a two-step process of making acetylene is entirely feasible and practical, the two steps being as follows:

(1) Treat any suitable hydrocarbon, for instance, gas oil, by my process at a temperature approximating 1500° F. to make a product containing a large amount of ethylene and unsaturated gases and oils.

(2) Re-treat this product at higher temperatures by which a high yield of acetylene will be obtained due to the suitability of ethylene as a starting material.

The following table gives a synopsis of the results obtained by treating the No. 1 gas oil, before mentioned, by the first step of this process in order to produce a large yield of ethylene:

a. Lbs. mercury used per hour.
b. Lbs. oil used per hour.
c. Cu. ft. gas formed per hour, calculated to one atmosphere absolute pressure and room temperature.
d. Millimeters of mercury partial pressure of oil before cracking.
e. Millimeters of mercury partial pressure of formed gas after cooling and before condensing diluent mercury.
f. Percent by weight of oil converted into gas.
g. Percent by weight of oil converted into ethylene.
h. Fahrenheit temperature.
i. Percent ethylene in the formed gas.
j. Tube size, inside diameter.

| Test No. | a | b | c | d | e | f | g | h | i | j | k |
|---|---|---|---|---|---|---|---|---|---|---|---|
| 108 | 3.30 | 0.1333 | .1237 | 4.30 | 14.55 | 50.8 | 19.7 | 1553 | 34.2 | 1/8 | 30.0 |
| 109 | 2.86 | 0.1333 | .1722 | 4.95 | 22.9 | 66.5 | 26.2 | 1706 | 30.9 | 1/8 | 35.7 |
| 110 | 1.655 | .00690 | .0745 | 4.38 | 17.47 | 52.0 | 18.0 | 1399 | 26.0 | 1/8 | 61.8 |
| 111 | 1.400 | .00781 | .0799 | 5.61 | 20.7 | 46.0 | 19.5 | 1553 | 29.3 | 1/8 | 69.0 |
| 112 | 1.685 | .00727 | .0669 | 4.61 | 15.4 | 47.8 | 18.8 | 1698 | 32.0 | 1/16 | 7.7 |
| 113 | 1.730 | .00709 | .0856 | 3.91 | 19.1 | 54.1 | 21.4 | 1842 | 27.2 | 1/16 | 7.5 |

These tests were carried out with the apparatus of Fig. 1. ($k$) Number proportional roughly to time of heating.

Statement of gas composition for the above tests:

l. carbon dioxide, $CO_2$
m. oxygen, $O_2$
n. mixture of olefines or alkylenes, all except ethylene.
o. ethylene, $C_2H_4$.
p. acetylene, $C_2H_2$.
q. hydrogen, $H_2$.
r. carbon monoxide, CO.
s. methane, $CH_4$.
t. ethane, $C_2H_6$, though there are other paraffins present.
u. nitrogen, $N_2$.

| Test No. | l | m | n | o | p | q | r | s | t | u |
|---|---|---|---|---|---|---|---|---|---|---|
| 108 | 1.63 | 0.0 | 21.75 | 34.2 | 1.13 | 14.5 | 1.3 | 23.7 | 1.7 | 0.0 |
| 109 | .78 | 0.0 | 7.9 | 30.9 | 3.02 | 23.7 | 2.2 | 12.7 | 18.6 | 0.0 |
| 110 | 2.76 | 0.48 | 11.5 | 26.0 | 0.00 | 18.9 | 1.2 | 34.9 | 4.3 | 0.0 |
| 111 | 2.4 | 0.52 | 6.8 | 29.3 | 0.82 | 22.7 | 1.4 | 35.1 | 0.8 | 0.0 |
| 112 | 2.7 | 0.0 | 16.7 | 32.0 | 3.33 | 18.8 | 1.3 | 24.7 | 0.5 | 0.0 |
| 113 | 1.8 | 0.22 | 7.6 | 27.2 | 8.64 | 26.1 | 2.0 | 26.3 | 0.0 | 0.0 |

In the claims I have used the term "inert diluent" to include all gases which function principally as diluents, which do not of themselves decompose to form acetylene and which do not prevent the formation of acetylene. However, as previously stated, the diluent used need not be entirely unreactive. Steam, for instance, reacts with the suitable gaseous raw materials or their decomposition products to form a certain amount of carbon monoxide, but this or any similar reaction does not appreciably hinder the process. I have used the words "gas" and "gaseous" broadly, that is, to include not only true gases but also vapors.

I claim as my invention:

1. A process of producing a gaseous mixture containing a recoverable percentage of acetylene which comprises: heating a gaseous mixture containing gaseous raw material suitable for the production of acetylene, said suitable gaseous raw material being mixed with an inert diluent, said heating being conducted at a temperature preferably considerably in excess of 1500° F. and for a period of less than five seconds and the gaseous mixture being maintained at about atmospheric pressure during said heating; thereafter cooling the heated mixture as rapidly as possible to a temperature at which acetylene is stable; and separating the acetylene from the gaseous mixture containing it.

2. A process of producing a gaseous mixture containing a recoverable percentage of acetylene which comprises: heating a gaseous mixture containing gaseous raw material suitable for the production of acetylene, said suitable gaseous raw material being mixed with an inert diluent, said heating being conducted at a temperature preferably considerably in excess of 1500° F. and for a period of less than five seconds and the gaseous mixture being maintained at about atmospheric pressure during said heating, the proportions of the different gases in the mixture being such that the gas constituting said suitable gaseous raw material is at a partial vapor pressure of less than seventy-five millimeters of mercury (absolute) during the heating operation; and thereafter cooling the heated mixture as rapidly as possible to a temperature at which acetylene is stable.

3. A process of producing a gaseous mixture containing more than ten percent of acetylene which comprises: heating a gaseous mixture containing gaseous raw material suitable for the production of acetylene, said suitable gaseous raw material being mixed with a preponderant proportion of an inert diluent, said heating being conducted at a temperature preferably considerably in excess of 1500° F. and for a period of less than five seconds and the gaseous mixture being maintained at about atmospheric pressure during said heating; and thereafter cooling the heated mixture as rapidly as possible to a temperature at which acetylene is stable.

4. A process of producing a gaseous mixture containing more than ten percent of acetylene which comprises: heating a gaseous mixture containing gaseous raw material suitable for the production of acetylene, said suitable gaseous raw material being mixed with a preponderant proportion of an inert diluent, said heating being conducted at a temperature preferably considerably in excess of 1500° F. and for a period of less than five seconds and the gaseous mixture being maintained at atmospheric pressure during said heating, the proportions of the different gases in the mixture being such that the gas constituting said suitable gaseous raw material is at a partial vapor pressure of less than seventy-five millimeters of mercury (absolute) during the heating operation; and thereafter cooling the heated mixture as rapidly as possible to a temperature at which acetylene is stable.

5. A process of producing a gaseous mixture containing a recoverable percentage of acetylene which comprises: heating a gaseous mixture containing gaseous raw material suitable for the production of acetylene, said suitable gaseous raw material being diluted with steam, said heating being conducted at a temperature preferably considerably in excess of 1500° F. and for a period of less than five seconds and the gaseous mixture being maintained at about atmospheric pressure during said heating; and thereafter cooling the heated mixture as rapidly as possible to a temperature at which acetylene is stable.

6. A process of producing a gaseous mixture containing a recoverable percentage of acetylene which comprises: heating a gaseous mixture containing gaseous raw material suitable for the production of acetylene, said suitable gaseous raw material being diluted with steam, said heating being conducted at a temperature preferably considerably in excess of 1500° F. and for a period of less than five seconds and the gaseous mixture being maintained at about atmospheric pressure during said heating, the proportions of the different gases in the mixture being such that the gas constituting said suitable gaseous raw material is at a partial vapor pressure of less than seventy-five millimeters of mercury (absolute) during the heating operation; and thereafter cooling the heated mixture as rapidly as possible to a temperature at which acetylene is stable.

7. A process of producing a gaseous mixture containing more than ten percent of acetylene which comprises: heating a gaseous mixture containing gaseous raw material suitable for the production of acetylene, said suitable gaseous raw material being diluted with a preponderant proportion of steam, said heating being conducted at a temperature preferably considerably in excess of 1500° F. and for a period of less than five seconds and the gaseous mixture being maintained at about atmospheric pressure during said heating; and thereafter cooling the heated mixture as rapidly as possible to a temperature at which acetylene is stable.

8. A process of producing a gaseous mixture containing more than ten percent of acetylene which comprises: heating a gaseous mixture containing gaseous raw material suitable for the production of acetylene, said suitable gaseous raw material being diluted with a preponderant proportion of steam, said heating being conducted at a temperature preferably considerably in excess of 1500° F. and for a period of less than five seconds and the gaseous mixture being maintained at about atmospheric pressure during said heating, the proportions of the different gases in the mixture being such that the gas constituting said suitable gaseous raw material is at a partial vapor pressure of less than seventy-five millimeters of mercury (absolute) during the heating operation; and thereafter cooling the heated mixture as rapidly as possible to a temperature at which acetylene is stable.

9. A process of producing a gaseous mixture containing a recoverable percentage of acetylene which comprises: heating a gaseous mixture containing gaseous raw material suitable for the production of acetylene, said suitable gaseous raw material being diluted with a mercury vapor, said heating being conducted at a temperature preferably considerably in excess of 1500° F. and for a period of less than five seconds and the gaseous mixture being maintained at about atmospheric pressure during said heating; and thereafter cooling the heated mixture as rapidly as possible to a temperature at which acetylene is stable.

10. A process of producing a gaseous mixture containing a recoverable percentage of acetylene which comprises: heating a gaseous mixture containing gaseous raw material suitable for the production of acetylene, said suitable gaseous raw material being diluted with a preponderant proportion of mercury vapor, said heating being conducted at a temperature preferably considerably in excess of 1500° F. and for a period of less than five seconds and the gaseous mixture being maintained at about atmospheric pressure during said heating, the proportions of the different gases in the mixture being such that the gas constituting said suitable gaseous raw material is at a partial vapor pressure of less than seventy-five millimeters of mercury (absolute) during the heating operation; and thereafter cooling the heated mixture as rapidly as possible to a temperature at which acetylene is stable.

11. A process of producing a gaseous mixture containing more than ten percent of acetylene which comprises: heating a gaseous mixture containing gaseous raw material suitable for the production of acetylene, said suitable gaseous raw material being diluted with a preponderant proportion of mercury vapor, said heating being conducted at a temperature preferably considerably in excess of 1500° F. and for a period of less than five seconds and the gaseous mixture being maintained at about atmospheric pressure during said heating; and thereafter cooling the heated mixture as rapidly as possible to a temperature at which acetylene is stable.

12. A process of producing a gaseous mixture containing more than ten percent of acetylene which comprises: heating a gaseous mixture containing gaseous raw material suitable for the production of acetylene, said suitable gaseous raw material being diluted with a preponderant proportion of mercury vapor, said heating being conducted at a temperature preferably considerably in excess of 1500° F. and for a period of less than five seconds and the gaseous mixture being maintained at about atmospheric pressure during said heating, the proportions of the different gases in the mixture being such that the gas constituting said suitable gaseous raw material is at a partial vapor pressure of less than seventy-five millimeters of mercury (absolute) during the heating operation; and thereafter cooling the heated mixture as rapidly as possible to a temperature at which acetylene is stable.

In testimony whereof, I have hereunto set my hand at Los Angeles, California, this 25th day of September, 1928.

ROBERT G. WULFF.

CERTIFICATE OF CORRECTION.

Patent No. 1,880,309. October 4, 1932.

ROBERT G. WULFF.

It is hereby certified that error appears in the printed specification of the above numbered patent requiring correction as follows: Page 13, line 21, claim 10, strike out the words "preponderant proportion of"; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.